US009385571B2

(12) United States Patent
Honda et al.

(10) Patent No.: US 9,385,571 B2
(45) Date of Patent: Jul. 5, 2016

(54) STATOR MEMBER

(71) Applicant: AISAN KOGYO KABUSHIKI KAISHA, Aichi-ken (JP)

(72) Inventors: Yoshihiko Honda, Aichi-ken (JP); Hiroaki Arita, Aichi-ken (JP); Yoichi Kawakita, Aichi-ken (JP)

(73) Assignee: AISAN KOGYO KABUSHIKI KAISHA, Aichi-Ken (JP)

( * ) Notice: Subject to any disclaimer, the term of this patent is extended or adjusted under 35 U.S.C. 154(b) by 350 days.

(21) Appl. No.: 13/915,587

(22) Filed: Jun. 11, 2013

(65) Prior Publication Data
US 2013/0336817 A1    Dec. 19, 2013

(30) Foreign Application Priority Data

Jun. 19, 2012    (JP) .................................. 2012-137641

(51) Int. Cl.
H02K 3/50    (2006.01)
H02K 3/52    (2006.01)
H02K 5/12    (2006.01)
H02K 5/22    (2006.01)

(52) U.S. Cl.
CPC ................. *H02K 3/50* (2013.01); *H02K 3/522* (2013.01); *H02K 5/12* (2013.01); *H02K 5/225* (2013.01)

(58) Field of Classification Search
CPC ......... H02K 11/00; H02K 3/50; H02K 5/225; H02K 5/22; H02K 3/52
USPC ......................................... 310/71; 417/410.1
See application file for complete search history.

(56) References Cited

U.S. PATENT DOCUMENTS

| 6,469,413 | B1 * | 10/2002 | Oohashi et al. ............... 310/184 |
| 8,288,903 | B2 | 10/2012 | Matsuda et al. |
| 2004/0007934 | A1 | 1/2004 | Michaels et al. |
| 2004/0256936 | A1 | 12/2004 | Takahashi et al. |
| 2005/0088049 | A1 | 4/2005 | De Filippis et al. |

(Continued)

FOREIGN PATENT DOCUMENTS

CN    1957517 A    5/2007
CN    101964554 A    2/2011

(Continued)

OTHER PUBLICATIONS

English Translation of Abstract of Japanese Patent Application No. JP 2001-103700.

(Continued)

*Primary Examiner* — Thomas Truong
*Assistant Examiner* — Noli Manaloto
(74) *Attorney, Agent, or Firm* — Vierra Magen Marcus LLP

(57) ABSTRACT

A stator member may comprise a core member comprising a plurality of cores disposed juxtaposed to one another, a coil being wound around each of the cores and a terminal member attached to one end of the core member. The terminal member may comprise a terminal portion comprising three external terminal portions used as terminals of U, V, and W phase and a common terminal portion used as a common terminal. The three external terminal portions and the common terminal may be integrally provided. A plurality of fitting portions may protrude from the terminal portion toward the core member. Each of the plurality of fitting portions may be configured to be fitted into a corresponding one of a plurality of recessed portions formed at the one end of the core member in an elastic deformed state.

7 Claims, 14 Drawing Sheets

(56) References Cited

U.S. PATENT DOCUMENTS

| | | | |
|---|---|---|---|
| 2006/0043806 A1 | 3/2006 | Torii | |
| 2007/0252454 A1* | 11/2007 | Hayashi et al. | 310/71 |
| 2007/0273221 A1 | 11/2007 | Kinoshita et al. | |
| 2008/0157610 A1 | 7/2008 | Watanabe et al. | |
| 2010/0133934 A1* | 6/2010 | Muramoto | 310/71 |
| 2011/0020154 A1* | 1/2011 | Matsuda et al. | 417/410.1 |
| 2011/0068647 A1 | 3/2011 | Sakaue et al. | |
| 2011/0080072 A1 | 4/2011 | Strobel et al. | |
| 2011/0156512 A1 | 6/2011 | Shimomura | |
| 2011/0175471 A1 | 7/2011 | Marchitto et al. | |
| 2012/0027629 A1 | 2/2012 | Tanahashi et al. | |
| 2012/0112580 A1* | 5/2012 | Sato | H02K 3/522 310/71 |
| 2012/0286593 A1 | 11/2012 | Yokogawa | |
| 2012/0293024 A1 | 11/2012 | Yokogawa | |
| 2014/0099221 A1 | 4/2014 | Tanahashi et al. | |

FOREIGN PATENT DOCUMENTS

| | | |
|---|---|---|
| CN | 102163885 A | 8/2011 |
| CN | 102345610 A | 2/2012 |
| JP | S5947954 A | 3/1984 |
| JP | S59189455 U | 12/1984 |
| JP | S6392239 A | 4/1988 |
| JP | 2001-103700 | 4/2001 |
| JP | 2004336897 A | 11/2004 |
| JP | 2006-67740 | 3/2006 |
| JP | 2007318885 A | 12/2007 |
| JP | 2008167604 A | 7/2008 |
| JP | 2010-154701 | 7/2010 |
| JP | 2010183660 A | 8/2010 |
| JP | 2010200575 A | 9/2010 |
| JP | 2011030328 A | 2/2011 |
| JP | 2011-205876 | 10/2011 |
| JP | 2012031808 A | 2/2012 |
| WO | WO2009/060600 | 5/2009 |
| WO | 2009139067 A1 | 11/2009 |

OTHER PUBLICATIONS

Machine Translation of Japanese Patent Application No. JP 2001-103700 prepared by the Japanese Patent Office.
Family List of Japanese Patent Application No. JP 2006-67740.
English Translation of Abstract of Japanese Patent Application No. JP 2006-67740.
Machine Translation of Japanese Patent Application No. JP 2006-67740 prepared by the Japanese Patent Office.
English Translation of Abstract of Japanese Patent Application No. JP 2010-154701.
Machine Translation of Japanese Patent Application No. JP 2010-154701 prepared by the Japanese Patent Office.
Family List of Japanese Patent Application No. JP 2011-205876.
English Translation of Abstract of Japanese Patent Application No. JP 2011-205876.
Machine Translation of Japanese Patent Application No. JP 2011-205876 prepared by the Japanese Patent Office.
Office Action dated Mar. 6, 2014 in Korean Patent Application No. 2013-0021230, 8 pages.
Machine Translation of Japanese Patent Application No. JP 2011-030328 published Feb. 10, 2011.
Family List of Japanese Patent Application No. JP 2011-030328 published Feb. 10, 2011.
English Translation of Abstract of Japanese Patent Application No. JP 2011-030328 published Feb. 10, 2011.
Office Action dated Dec. 23, 2015, in Chinese Patent Application No. 201310244394.0.
Office Action dated Jun. 30, 2015 with English translation in Japanese Patent Application No. 2012-137641, 8 pages.
Office Action dated May 20, 2015 with English translation in Chinese Patent Application No. 201310244394.0, 23 pages.
English abstract, machine translation and family list for Japanese Publication No. JP2004336897 (A) dated Nov. 25, 2004, 29 pages.
English abstract and family list for Chinese Publication No. CN102345610 (A) dated Feb. 8, 2012, 24 pages.
English abstract and family list for Chinese Publication No. CN102163885 (A) dated Aug. 24, 2011, 11 pages.
English abstract, machine translation and family list for Japanese Publication No. JP2007318885 (A) dated Dec. 6, 2007, 23 pages.
English abstract and family list for International Publication No. WO2009139067 (A1) dated Nov. 19, 2009, 45 pages.
English abstract and machine translation for Japanese Publication No. JP2010200575 (A) dated Sep. 9, 2010, 23 pages.
English abstract, machine translation and family list for Japanese Publication No. JP2012031808 (A) dated Feb. 16, 2012, 34 pages.
English abstract, machine translation and family list for Japanese Publication No. JP2008167604 (A) dated Jul. 17, 2008, 37 pages.
English abstract for Japanese Publication No. JPS5947954 (A) dated Mar. 17, 1984, 8 pages.
English abstract for Japanese Publication No. JPS6392239 (A) dated Apr. 22, 1988, 6 pages.
English abstract and machine translation for Japanese Publication No. JP2010183660 (A) dated Aug. 19, 2010, 25 pages.

* cited by examiner

STATOR MEMBER

CROSS-REFERENCE TO RELATED APPLICATION

This application claims priority to Japanese Patent Application No. 2012-137641 filed on Jun. 19, 2012, the contents of which are hereby incorporated by reference into the present application.

TECHNICAL FIELD

This application discloses a stator member used for a stator of a brushless motor.

DESCRIPTION OF RELATED ART

Japanese Patent Application Publication No. 2010-154701 discloses a brushless motor including a stator assembly. In the brushless motor, the stator assembly includes a stator main body and a terminal. A plurality of recessed portions of the terminal engages with terminal attaching portions of the stator, whereby the terminal is attached to the stator main body.

SUMMARY

In a configuration in which the recessed portions of the terminal simply engages with the terminal attaching portions, if the recessed portions are formed larger than the terminal attaching portions, the terminal is not stably supported by the stator main body.

This specification provides a technique that terminal members configuring respective terminals of a brushless motor may be stably supported by a core member configuring a core of a stator.

A technique disclosed herein is a stator member to be used in a stator of a brushless motor. The stator member may comprise a core member, and to terminal member. The core member may comprise a plurality of cores disposed juxtaposed to one another, with a coil being wound around each of the cores. The terminal member may be attached to one end of the core member. The terminal member may comprise a terminal portion, and a plurality of fitting portions. The terminal portion may comprise three external terminal portions used as terminals of U, V, and W phase and a common terminal portion used as a common terminal. The three external terminal portions and the common terminal may be integrally provided. The plurality of fitting portions may protrude from the terminal portion toward the core member. Each of the plurality of fitting portions may be fitted into a corresponding one of a plurality of recessed portions formed at the one end of the core member in an elastic deformed state.

In this configuration, the plurality of fitting portions is fitted into the recessed portions of the core member in the elastically deformed state, whereby the terminal member is attached to the core member. Since the fitting portions are fitted into the recessed portions in the elastically deformed state, the fitting portions are appropriately fixed by the recessed portions. As a result, the terminal member is stably supported on the core member. With this configuration, the terminal member may be stably supported by the core member.

DETAILED DESCRIPTION

Figure 1:
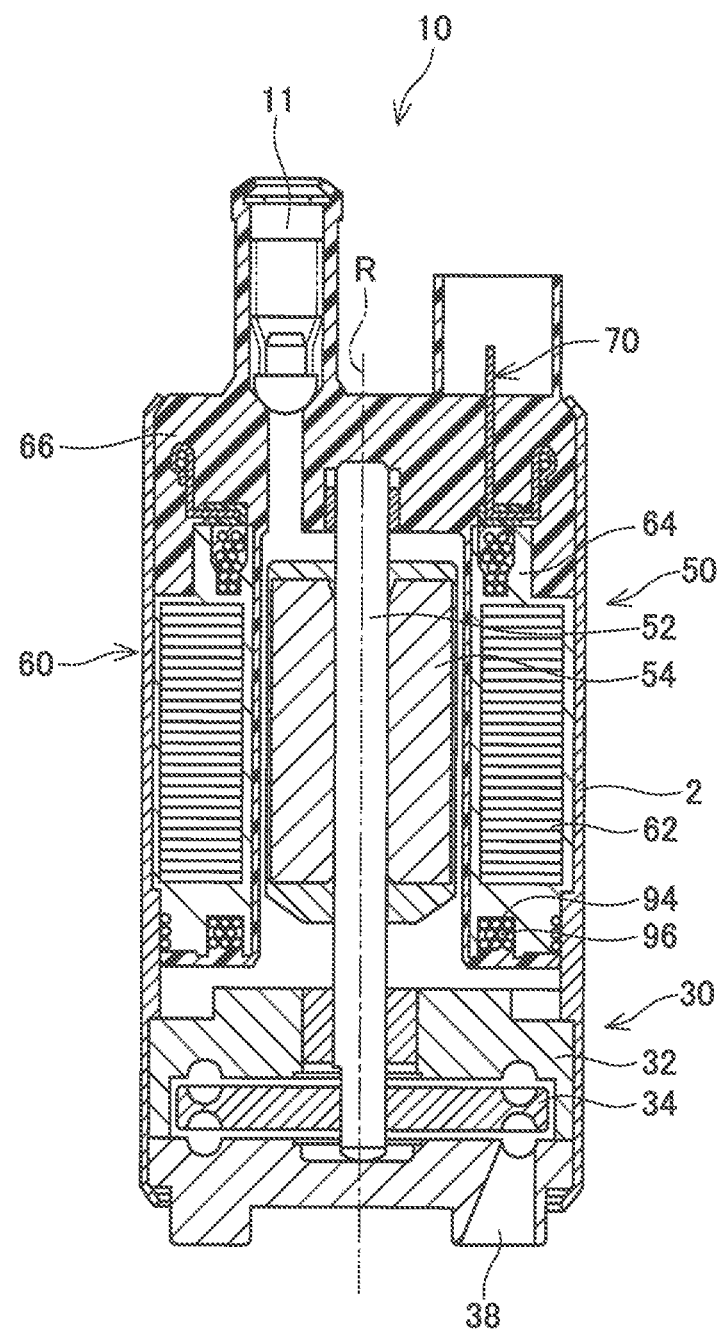
FIG. 1 shows a longitudinal sectional view of a fuel pump.

Some of the features of embodiments disclosed herein will be listed.

(Feature 1) Each of three external terminal portions and a common terminal portion may comprise an adhering portion adhered to an adhering section of a corresponding coil extending from one end of a core member toward a terminal member.

With this configuration, the external terminal portions and the common terminal portion may be appropriately connected to the coil.

(Feature 2) Each of the three external terminal portions may further comprise a base portion and a connector portion. The base portion may be configured to be connected to a juxtaposed external terminal portion. The connector portion may be connected to a connector of an external power source and extend from the base portion to an opposite side of the core member (i.e. in a direction away from the core member). The adhering portions of the three external terminal portions may extend from the base portion to the opposite side of the core member and be disposed on an outer circumferential side of the connector portions in a state where the three external terminal portions and the common terminal portion are disposed in an annular shape.

With this configuration, in a state where a plurality of cores is disposed in an annular shape, when the adhering portion and the coil are adhered, the connector portion does not obstruct the adhesion. Therefore, the adhering portion and the coil may be easily adhered.

(Feature 3) Each of the adhering portions may be disposed by sandwiching the adhering section of the corresponding coil, and the adhering portions may be connected to one another on the opposite side of the core member than where the adhering sections of the coils are positioned.

With this configuration, when the terminal member is set in the core member, the coil may be easily disposed in a gap of the adhering portion. In addition, each of the adhering portions may comprise a hook portion. Each adhering portion and hook portion may sandwich the adhering section of the corresponding coil. The adhering portions and the hook portions may be connected to one another on the opposite side of the core member than where the adhering sections of the coils are positioned.

(Feature 4) Each of the plurality of cores may comprise a supporting portion disposed on an end of the core on a terminal member side to support both ends of the adhering section of the corresponding coil.

With this configuration, when the terminal member is set in the core member, the position of the adhering section of the coil may be prevented from shifting.

(Feature 5) Each coil may extend from an end of the corresponding core on a terminal member side toward the terminal member side, and the terminal member may comprise one or more nonconductive restricting portions that restrict the coils extending from the ends of the plurality of cores on the terminal member side from moving toward an outer side more than an outer circumferential plane formed by the plurality of cores in a state where the plurality of cores is disposed in an annular shape.

With this configuration, the coil may be prevented from extending further to the outer side than the outer circumferential surface of the stator main body formed by the core member. Therefore, the coil may be suppressed from coming into contact with a member of a conductive material (e.g., a housing of a brushless motor) located on the outer circumferential surface of the stator.

(Feature 6) The stator member may be used in a stator of a brushless motor disposed in an electric pump. The stator member may further comprise an outer wall made of resin that covers at least a part of the terminal member, the core member, or both the terminal member and the core member, and the outer wall may comprise an outlet that discharges fluid pressurized by the electric pump to outside the electric pump.

With this configuration, a configuration for protecting the plurality of cores and the outlet may be integrally molded by resin molding. As a result, the number of components of the electric pump may be reduced.

(Feature 7) The terminal member may further comprise a nonconductive connecting portion that connects the three external terminal portions and the common terminal portion.

With this configuration, the three external terminal portions and the common terminal portion are insulated from each other by the connecting portion. Therefore, when the stator is manufactured using the stator member, the connecting portion does not have to be cut.

(Feature 8) The terminal member may further comprise a connecting portion that connects the three external terminal portions and the common terminal portion. The connecting portion may be formed of a same material as the three external terminal portions and the common terminal portion, and the connecting portion may comprise one or more cut-off portions configured to be cut off before applying current to the coils.

With this configuration, the connecting portion may be manufactured simultaneously with the three external terminal portions and the common terminal portion. Therefore, the terminal member may be easily manufactured.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved stator members, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

As shown in FIG. 1, a stator 60 in this embodiment is used for a fuel pump 10. The fuel pump 10 is disposed in a fuel tank (not shown in the figure) and supplies fuel (e.g., gasoline) to an engine (not shown in the figure) of an automobile. As shown in FIG. 1, the fuel pump 10 includes a motor section 50 and a pump section 30. The motor section 50 and the pump section 30 are disposed in a housing (i.e., outer housing) 2. The housing 2 has a cylindrical shape opened at both ends.

The pump section 30 comprises a casing (i.e., inner housing) 32 and an impeller 34. The casing 32 closes an opening at a lower end of the housing 2. An inlet 38 is provided at a lower end of the casing 32. A communication hole (not shown in the figure) that allows an inside of the casing 32 and the motor 50 to communicate with each other is provided at an upper end of the casing 32. The impeller 34 is housed in the casing 32.

The motor section 50 is located above the pump section 30. The motor section 50 is a brushless motor. The motor section 50 is a three-phase motor. The motor section 50 comprises a rotor 54 and the stator 60. The rotor 54 includes a permanent magnet. A shaft 52 is fixed to a center of the rotor 54 while piercing through the rotor 54. A lower end of the shaft 52 is inserted into and pierces through a center portion of the impeller 34. The rotor 54 is rotatably supported around a rotation axis R by bearings disposed at both end portions of the shaft 52. In this embodiment, "above" and "below" are defined in a state shown in FIG. 1. That is, the pump section 30 is located "below" viewed from the motor 50. The motor 50 is located "above" viewed from the pump section 30.

The stator 60 comprises a core member 90, a terminal member 70, and an outer wall 66. The stator 60 is pressed into the housing 2. The outer wall 66 covers a lower end face, an upper end face, and an inner circumferential surface opposed to an outer circumferential surface of the rotor 54 on a surface of the core member 90. With other words, the lower end face, the upper end face, and the inner circumferential surface of the core member 90 are covered by the outer wall 66 wherein the inner circumferential surface of the core member 90 is opposed to the outer circumferential surface of the rotor 54. In a modification, the outer wall 66 may cover the upper end face and the lower end face and not cover the inner circumferential surface opposed to the outer circumferential surface of the rotor 54 on the surface of the core member 90. In other words, the outer wall 66 covers at least the upper and lower end faces of the core member 90 on the surface of the core member 90. Further, the outer wall 66 covers a part of the terminal member 70.

The outer wall 66 closes an opening at an upper end of the housing 2. An outlet 11 is formed at an upper end of the outer wall 66. The outlet 11 allows the motor section 50 and a fuel channel on an outside of the fuel pump 10 to communicate with each other. The outlet 11 is an opening for discharging the fuel pressurized by the pump section 30 to the fuel channel. In the outer wall 66, a portion covering the core member 90 and the outlet 11 are integrally molded by resin. In the modification, the portion covering the core member 90 and the outlet 11 may be separated.

Figure 2:
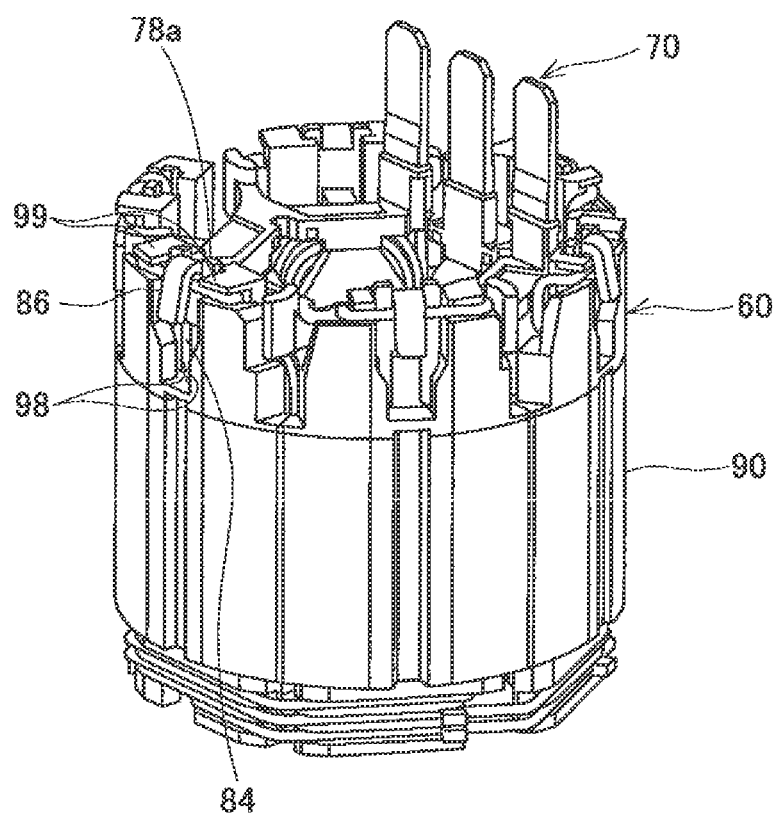
FIG. 2 shows a perspective view of a state where a terminal member and a core member are assembled in a first embodiment.
Figure 3:
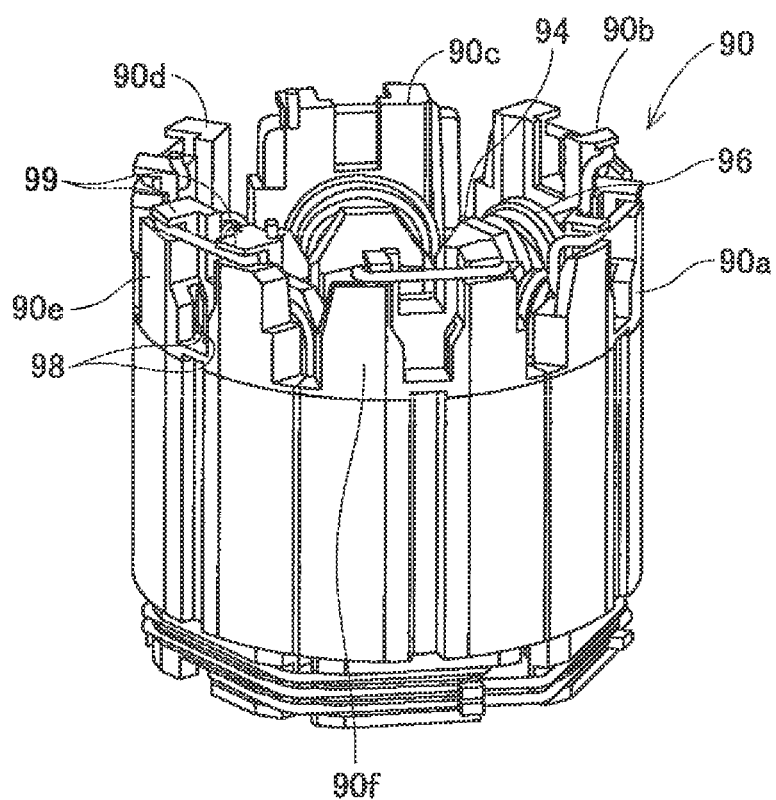
FIG. 3 shows a perspective view of the core member in the first embodiment.

As shown in FIG. 2, the core member 90 is located below the terminal member 70. The core member 90 has a substantially cylindrical shape (see FIG. 3). The rotor 54 is disposed in a center portion of the core member 90. The core member 90 comprises a plurality of core plates 62 and an insulating material 64. The plurality of core plates 62 is laminated. The core plates 62 have an annular shape. The insulating material 64 covers the plurality of core plates 62. As shown in FIG. 3, six (a plurality of) cores 90a to 90f are formed by the plurality of core plates 62 and the insulating material 64. The cores 90a and 90d are in a U phase, the cores 90b and 90e are in a V phase, and the cores 90c and 90f are in a W phase.

The cores 90a to 90f are disposed juxtaposed to one another in an annular shape. The cores 90a to 90f comprise teeth 94 and coils 96. In FIG. 3, only the tooth 94 and the coil 96 of the core 90b are denoted by reference signs. However, the other cores 90a to 90f comprise the teeth 94 and the coils 96 in the same manner as the core 90b. The teeth 94 of the cores 90a to 90f are juxtaposed along an outer circumferential surface of the rotor 54. The teeth 94 extend from an outer circumferential side toward an inner circumferential side (i.e., the rotor 54 side) of the core member 90. Ends on the inner circumferential side of the teeth 94 are formed in a shape extending along the outer circumferential surface of the rotor 54. The coils 96 are wound around intermediate portions between the ends on the inner circumferential side and ends on the outer circumferential side of the teeth 94. The coils 96 respectively wound around the teeth 94 of the cores 90a and 90d are electrically connected. Similarly, the coils 96 of the cores 90b and 90e are electrically connected and the coils 96 of the cores 90c and 90f are electrically connected.

The cores 90a to 90f comprise pairs of insertion grooves 98 and pairs of supporting portions 99. The pairs of insertion grooves 98 and the pairs of supporting portions 99 are formed in the insulating material 64 of the cores 90a to 90f. In FIG. 3, only the insertion grooves 98 and the supporting portions 99 of the core 90e are denoted by reference numerals. However, the other cores 90a to 90f comprise the pairs of insertion grooves 98 and the pairs of supporting portions 99 in the same manner as the core 90e. The pairs of insertion grooves 98 are disposed spaced apart from each other in a circumferential direction of the core member 90. The insertion grooves 98 are formed further on the outer circumferential side than the teeth 94 and at upper ends of the core 90a and the like (i.e., ends on the terminal member 70 side). The insertion grooves 98 extend linearly in an up down direction. Upper ends of the insertion grooves 98 are opened and, on the other hand, lower ends of the insertion grooves 98 are closed. One insertion groove 98 of each of the pairs of insertion grooves 98 is opened to the other insertion groove 98 side. A bottom surface of the one insertion groove 98 is disposed on an opposite side of the other insertion groove 98.

The pairs of supporting portions 99 are disposed spaced apart from each other in the circumferential direction of the core member 90. The space of the pairs of the supporting portions 99 is larger than the space of the pairs of insertion grooves 98. The supporting portions 99 are located further on the outer circumferential side than the insertion grooves 98. The supporting portions 99 are formed at the upper ends of the core 90a and the like and above the insertion grooves 98. The supporting portions 99 of the core 90a and the like hold ends of the coils 96 wound around the core 90a and the like. That is, the coils 96 are laid and suspended between the pairs of supporting portions 99. With other words, the ends of the coils 96 are held by the supporting portions 99.

Figure 4:
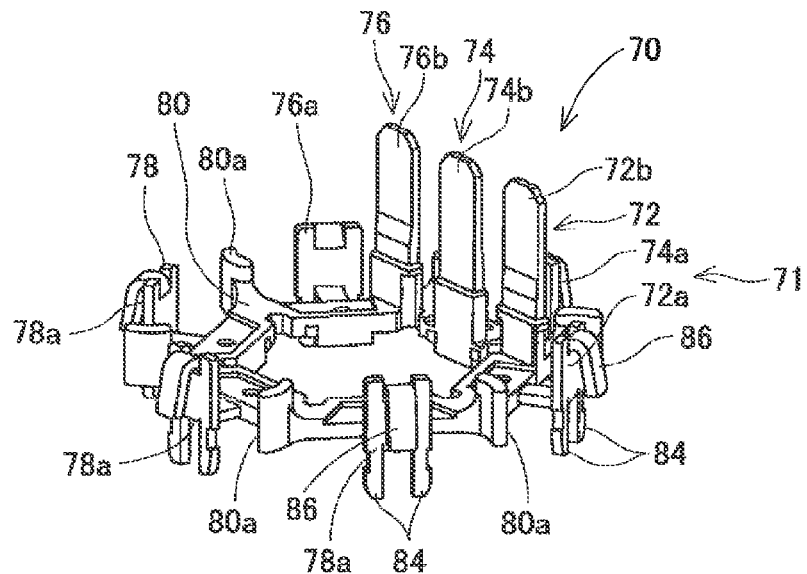
FIG. 4 shows a perspective view of the terminal member in the first embodiment.

As shown in FIG. 2, the terminal member 70 is disposed at an upper end of the core member 90. As shown in FIG. 4, the terminal member 70 comprises a terminal section 71 and a plurality of fitting portions 84 (six in this embodiment). The terminal section 71 comprises three external terminal portions 72, 74, and 76 and a common terminal portion 78. The three external terminal portions 72, 74, and 76 and the common terminal portion 78 are integrally manufactured. The three external terminal portions 72, 74, and 76 and the common terminal portion 78 are disposed in an annular shape.

Figure 5:
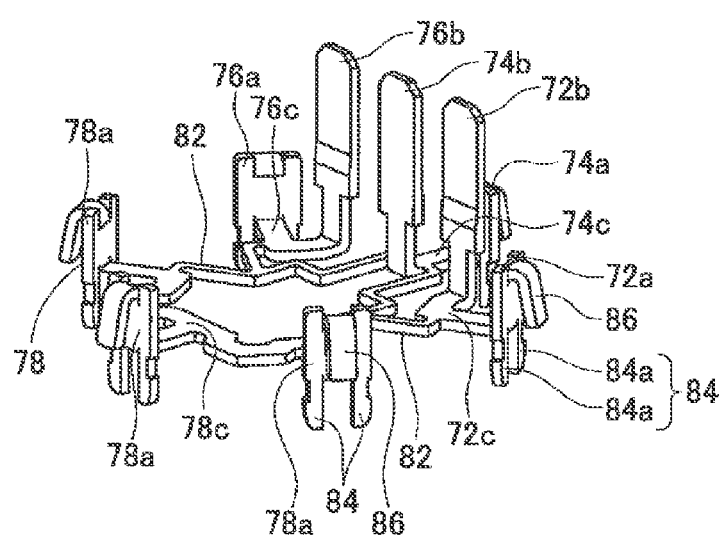
FIG. 5 shows a perspective view of an intermediate component of the terminal member in the first embodiment.

The external terminal portions 72 to 76 comprise base portions 72c, 74c, and 76c (see FIG. 5), connector portions 72b, 74b, and 76b, and adhering portions 72a, 74a, and 76a. As shown in FIG. 5, the three base portions 72c to 76c are disposed on a same plane. The connector portion 72b is connected to the base portion 72c. The connector portion 72b extends vertically upward (i.e., in an opposite direction of the core member 90) from the base portion 72c. A configuration of the connector portion 74b and the base portion 74c and a configuration of the connector portion 76b and the base portion 76c are the same as a configuration of the connector portion 72b and the base portion 72c. The connector portions 72b to 76b are connected in a state where the connector portions 72b to 76b are inserted into connectors for a three-phase alternating-current power source. That is, the external terminal portions 72 to 76 are respectively used as terminals of U, V, and W phases. The connector portions 72b to 76b have a flat shape and are disposed in parallel on a same plane.

The adhering portion 72a is connected to the base portion 72c. The adhering portion 72a extends vertically upward (i.e., in the opposite direction of the core member 90). A configuration of the adhering portion 74a and the base portion 74c and a configuration of the adhering portion 76a and the base portion 76c are the same as a configuration of the adhering portion 72a and the base portion 72c. The adhering portions 72a to 76a are disposed further on the outer circumferential side than the connector portions 72b to 76b. The adhering portions 72a to 76a comprise portions extending vertically upwards and hook portions 86 (only the hook portion 86 of the adhering portion 72a is denoted by reference numeral) obliquely extending from upper ends thereof to the outer circumferential side and downward. With other words, the adhering portions 72a to 76a have a V-shape wherein the bottom of the V-shape is directed away from the core member 90. This means, the hook portions 86 are opened towards the side of the core member 90.

Fitting portions 84 (only the fitting portion 84 of the adhering portion 72a is denoted by reference numeral) are disposed below the adhering portions 72a to 76a. The fitting portion 84 located below the adhering portion 72a projects from the base portion 72c downward (i.e., to the core member 90 side). The fitting portions 84 comprise pairs of insertion portions 84a. The pair of insertion portions 84a is disposed space apart from each other. Lower ends of the insertion portions 84a become thinner downward. As a result, width of the fitting portions 84 decreases downward. Maximum width of the fitting portions 84 is larger than width between bottom surfaces of the pairs of insertion grooves 98. The fitting portions 84 located below the adhering portions 74a and 76a have a configuration same as a configuration of the fitting portion 84 located below the adhering portion 72a.

The common terminal portion 78 is used as a common terminal. The common terminal portion 78 comprises a base portion 78e and three adhering portions 78a. The base portion 78c is disposed on a plane on which the three base portions 72c to 76c are disposed. The adhering portions 78a are connected to the base portion 78e. The adhering portions 78a extend vertically upward (i.e., in the opposite direction of the core member 90) from the base portion 78c. Each of the adhering portions 78a includes the hook portion 86 (only the hook portion 86 of one adhering portion 78a is denoted by reference numeral) same as the hook portions 86 of the adhering portions 72a to 76a.

The fitting portions 84 (only the fitting portion 84 of one adhering portion 78a is denoted by reference numeral) same as the fitting portion 84 located below the adhering portion 72a are provided below the adhering portions 78a. The fitting portions 84 project from the base portion 78c downward (i.e., to the core member 90 side). That is, the core member 90 comprises six sets of the adhering portions 72a to 78a and the fitting portions 84.

As shown in FIG. 4, the three external terminal portions 72 to 76 and the common terminal portion 78 are integrated by a connecting portion 80. The connecting portion 80 is made of resin. The connecting portion 80 has an annular shape and envelops the base portions 72c to 78c. The connecting portion 80 covers lower ends of the connector portions 72b to 76b. In the connecting portion 80, six projection portions 80a made of resin (only three projection portions 80a are denoted by reference signs) are formed. The projection portions 80a may be made of a nonconductive material other than resin. The projection portions 80a are disposed in vicinities of the adhering portions 72a to 78a. The projection portions 80a project from an annular portion of the connecting portion 80 toward an outer side and an upper side. The projection portions 80a project along a radial direction of the annular portion of the connecting portion 80.

Figure 6:
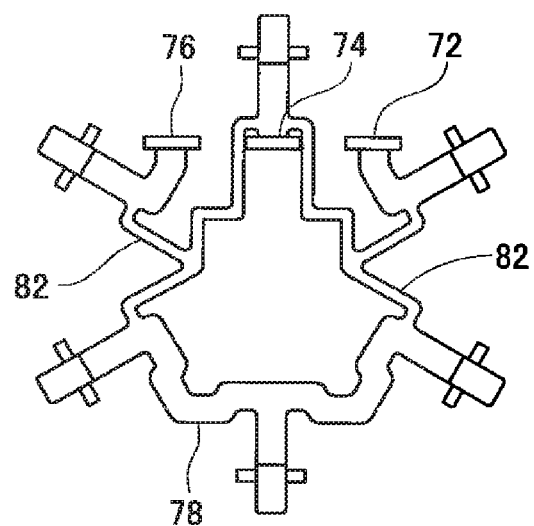
FIG. 6 shows a diagram of the intermediate component of the terminal member viewed from above in the first embodiment.
Figure 7:
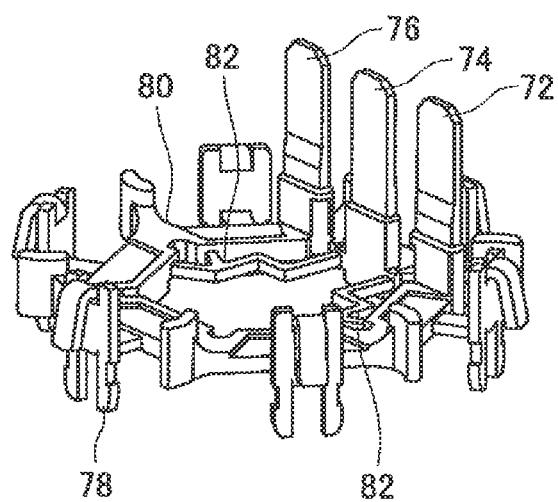
FIG. 7 shows a perspective view of a state where a connecting portion is molded in the intermediate portion of the terminal member in the first embodiment.

As shown in FIGS. 5 and 6, the three external terminal portions 72, 74, and 76 and the common terminal portion 78 are formed by pressing one flat plate. After the pressing, the terminal portions 72 to 78 are connected by connecting beams 82 in an annular shape. Subsequently, the terminal portions 72 to 78 after the pressing are disposed in a molding die to mold the connecting portion 80. As shown in FIG. 7, the connecting beams 82 exposed from the connecting portion 80 are cut, whereby the terminal member 70 is manufactured. Since the connecting beams 82 are cut, the terminal portions 72 to 78 are electrically insulated.

As shown in FIG. 2, the terminal member 70 is attached to the upper end of the core member 90. In this state, the adhering portion 72a and the fitting portion 84 below the adhering portion 72a are located between the pair of insertion grooves 98 of the core 90a, the adhering portion 74a and the fitting portion 84 below the adhering portion 74a are located between the pair of insertion grooves 98 of the core 90b, and the adhering portion 76a and the fitting portion 84 below the adhering portion 76a are located between the pair of insertion grooves 98 of the core 90c. Each of the three sets of adhering portions 78a and the fitting portions 84 is located between each of the three pairs of insertion grooves 98 of the cores 90d to 90f. The fitting portions 84 are inserted between the pairs of insertion grooves 98. Maximum width of the fitting portions 84 is larger than width of the pairs of insertion grooves 98. Therefore, when the fitting portions 84 are inserted into the insertion grooves 98, the pairs of insertion portions 84a are elastically deformed to come close to each other. As a result, the fitting portions 84 are fitted in the pairs of insertion grooves 98. The fitting portions 84 are fitted in the pairs of insertion grooves 98 in an elastically deformed state, whereby the terminal member 70 is fixed to the core member 90. Therefore, it is possible to suppress the fitting portions 84 from wobbling in the insertion grooves 98. As a result, the terminal member 70 is stably supported on the core member 90. With this configuration, the core member 90 (i.e., a stator main body of the stator 60) can stably support the terminal member 70 (i.e., a terminal of the stator 60). Therefore, positions of the connector portions 72b to 76b and welding positions of the coils 96 and the adhering portions 72a to 78a can be highly accurately positioned.

The fitting portions 84 of the terminal member 70 are manufactured by pressing. Therefore, positional accuracy of the fitting portions 84 is relatively high. On the other hand, the insertion grooves 98 are formed when the insulating material 64 are resin-molded. The core member 90 is manufactured by deforming six linearly juxtaposed cores to be juxtaposed in a cylindrical shape. Therefore, positional accuracy of the insertion grooves 98 is relatively low. As a result, when one fitting portion 84 and the pair of insertion grooves 98 are aligned, positions of the other fitting portions 84 and the other insertion grooves 98 sometimes shift. In the terminal member 70, the fitting portions 84 are elastically deformed, whereby it is possible to adjust a positional relation between the fitting portions 84 and the insertion grooves 98. Consequently, it is possible to appropriately fit each of the plurality of fitting portions 84 in the insertion grooves 98.

Since the fitting portions 84 are formed by the pairs of insertion portions 84a, the fitting portions 84 are easily deformed compared with fitting portions formed by one member. Therefore, the fitting portions 84 are easily elastically deformed, whereby it is easy to adjust the positional relation between the fitting portion 84 and the insertion grooves 98.

When the fitting portions 84 are located in positions where the fitting portions 84 are inserted into the insertion grooves 98, the adhering portions 72a to 78a are located above the pairs of supporting portions 99. When the terminal member 70 is moved downward and the fitting portions 84 are inserted into the insertion grooves 98, the coils 96 (or ends of coils) supported by the pairs of supporting portions 99 are held in the adhering portions 72a to 78a by the hook portions 86 of the adhering portions 72a to 78a. Subsequently, the adhering portions 72a to 78a and the coils 96 are adhered by welding. Specifically, lower ends of the hook portions 86 of the adhering portions 72a to 78a are deformed to the inner circumferential side and come into contact with the adhering portions 72a to 78a located on the inner circumferential side of the hook portions 86. Subsequently, contact surfaces are welded, whereby the adhering portions 72a to 78a and the coils 96 adhere and are electrically connected to each other. With this configuration, it is possible to appropriately adhere or electrically connect the terminal portions 72 to 78 and the coils 96.

The hook portions 86 extend from upper ends of the adhering portions 72a to 78a toward an outer circumference of the terminal member 70 and downward. In a state where the terminal member 70 is set in the core member 90, the adhering portions 72a to 78a are disposed across adhering sections of the coils 96 and connected with the hook portions 86 above the adhering sections of the coils 96 (i.e., on an opposite side of the core member 90). The adhering portions 72a to 78a (or the portions of the adhering portions 72a to 78a, which extend vertically upwards) and the hook portions 86 sandwich the adhering sections of the coils 96. With this configuration, when the terminal member 70 is assembled to the core member 90, it is possible to easily dispose the coils 96 in gaps of the adhering portions 72a to 78a. Both sides of the adhering sections of the coils 96 are supported by the pairs of supporting portions 99. Therefore, when the terminal member 70 is assembled to the core member 90, positions of the adhering sections of the coils 96 are prevented from shifting.

The adhering portions 72a to 76a of the external terminal portions 72 to 76 are located further on the outer circumferential side than the connector portions 72b to 76b. With this configuration, when the adhering portions 72a to 76a and the coils 96 are welded, the connector portions 72b to 76b do not obstruct the welding. Therefore, it is possible to easily adhere the adhering portions 72a to 76a and the coils 96. The adhering portions 72a to 76a are provided further on the outer circumferential side than the teeth 94 around which the coils 96 are wound. Therefore, it is possible to suppress sputter from scattering to the coils 96 during the welding.

Figure 8:
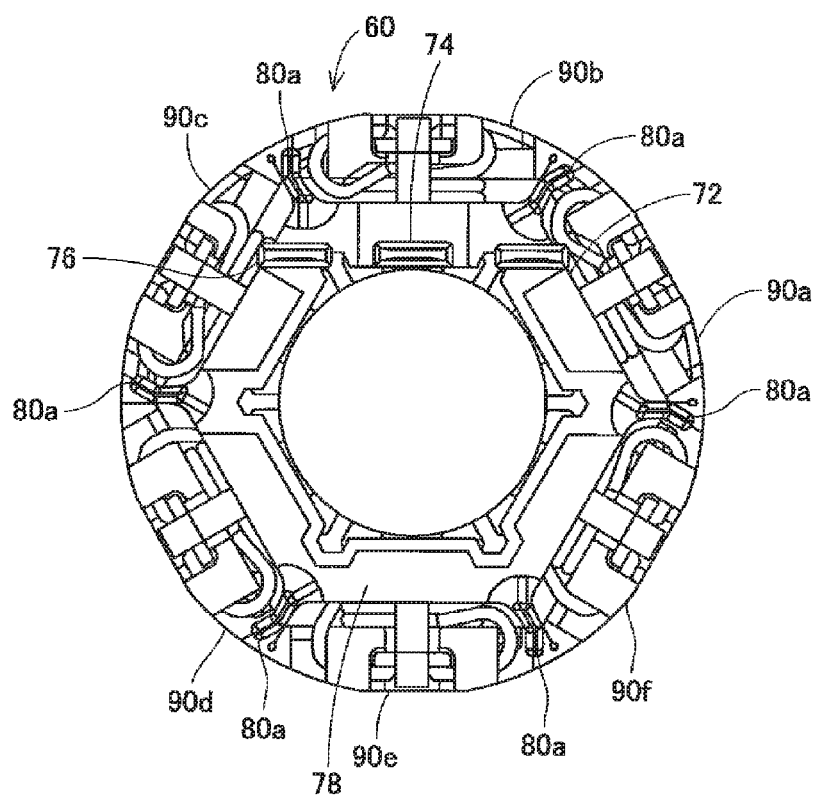
FIG. 8 shows a diagram of the state where the terminal member and the core member are assembled in the first embodiment viewed from above.

As shown in FIG. 8, the coils 96 wound around the cores 90a to 90f extend to above the cores 90a to 90f (i.e., the terminal member 70 side). Extending portions of the coils 96 extending to above the cores 90a to 90f are supported by the pairs of supporting portions 99. The extending portions of the coils 96 supported by the pairs of supporting portions 99 are bent to an inner side of the core member 90. The projection portions 80a of the connecting portions 80 are disposed to be opposed to bent portions of the coils 96. The projection portions 80a are bent along a shape of the bent portions of the coils 96.

After the terminal member 70 is assembled to the core member 90, the outer wall 66 that protects the plurality of cores 90a to 90f is formed. Specifically, the terminal member 70 and the core member 90 are disposed in a molding die and the outer wall 66 is molded with resin. In the molding of the outer wall 66, the bent portions of the coils 96 are pressed to the outer circumferential side of the core member 90 by resin flowing in the molding die. With the configuration, the coils 96 are suppressed from extending further to the outer side than an outer circumferential surface of the core member 90 by the projection portions 80a. Therefore, it is possible to suppress the coils 96 from coming into contact with the housing 2 which is conductive. The projection portions 80a project along a radial direction of the terminal member 70. Therefore, it is possible to suppress the flow of the resin in the molding die being obstructed by the projection portions 80a.

In the molding of the outer wall 66, the outlet 11 is molded. With this configuration, the outer wall 66 that protects the plurality of cores 90a to 90f and the outlet 11 can be integrally manufactured by the resin molding. Consequently, it is possible to reduce the number of components of the fuel pump 10.

(Correspondence Relation)

The stator 60 is an example of the "stator member". The six pairs of insertion grooves 98 are an example of the "plurality of recessed portions". The projection portion 80a is an example of the "restricting portion".

Second Embodiment

Figure 9:
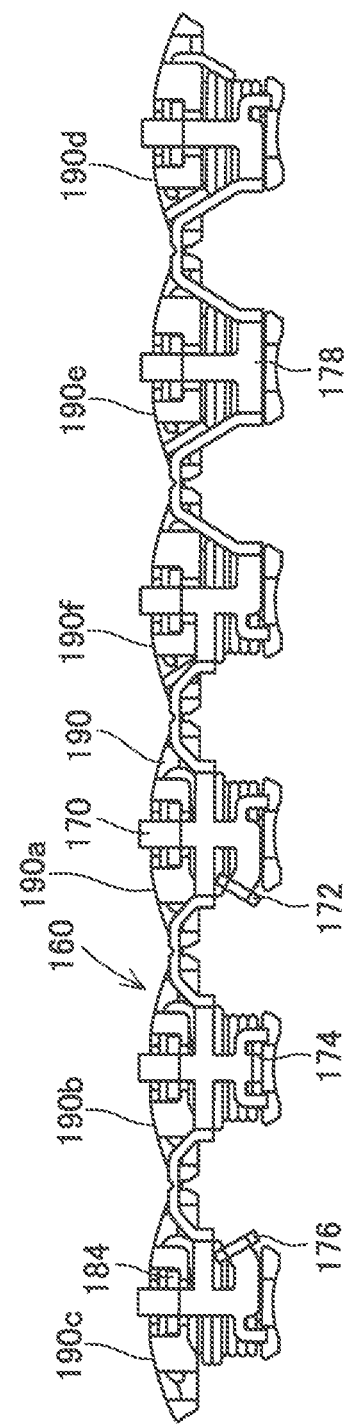
FIG. 9 shows a diagram of a stator member in a second embodiment viewed from above.
Figure 11:
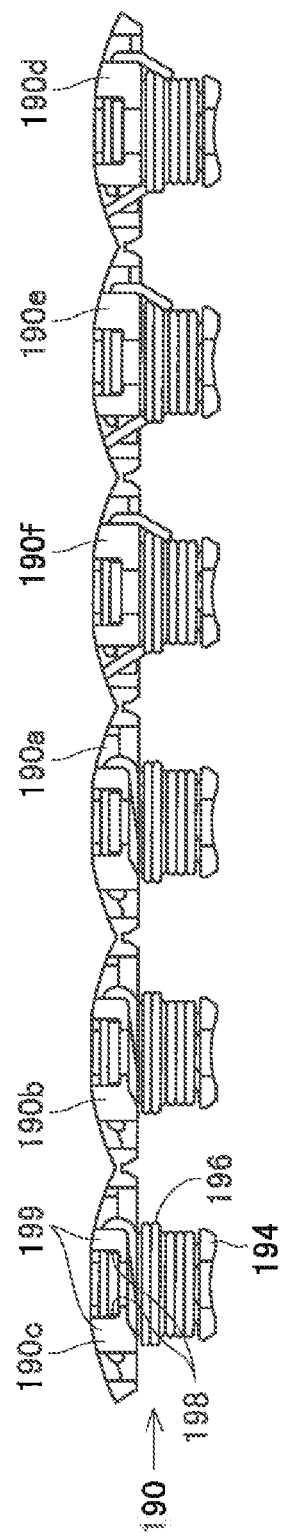
FIG. 11 shows a diagram of a core member in the second embodiment viewed from above.
Figure 12:
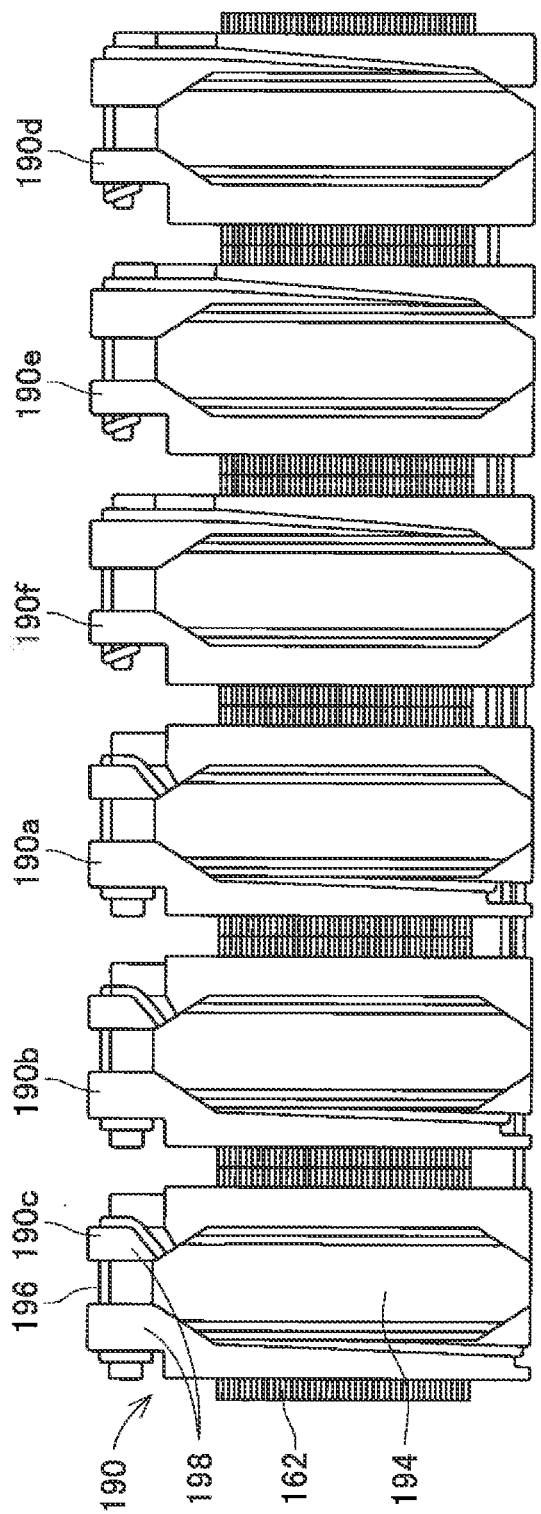
FIG. 12 shows a diagram of the core member in the second embodiment viewed from a teeth side.

As shown in FIG. 9, a stator member 160 comprises a terminal member 170 and a core member 190. The core member 190 comprises a plurality of cores 190a to 190f. A configuration of the plurality of cores 190a to 190l is the same as the configuration of the plurality of cores 90a to 90f in the first embodiment. That is, as shown in FIG. 11, like the cores 90a to 90f, the cores 190a to 190f comprise teeth 194, coils 196, pairs of insertion grooves 198, and pairs of supporting portions 199 (only the core 190c is denoted by reference sign). When viewed from above, the plurality of cores 190a to 190f is disposed juxtaposed on a straight line. Adjacent cores of the plurality of cores 190a to 190f are connected, whereby the plurality of cores 190a to 190f is integrally formed. As shown in FIG. 12, the plurality of cores 190a to 190l is connected by a plurality of core plates 162.

Figure 10:
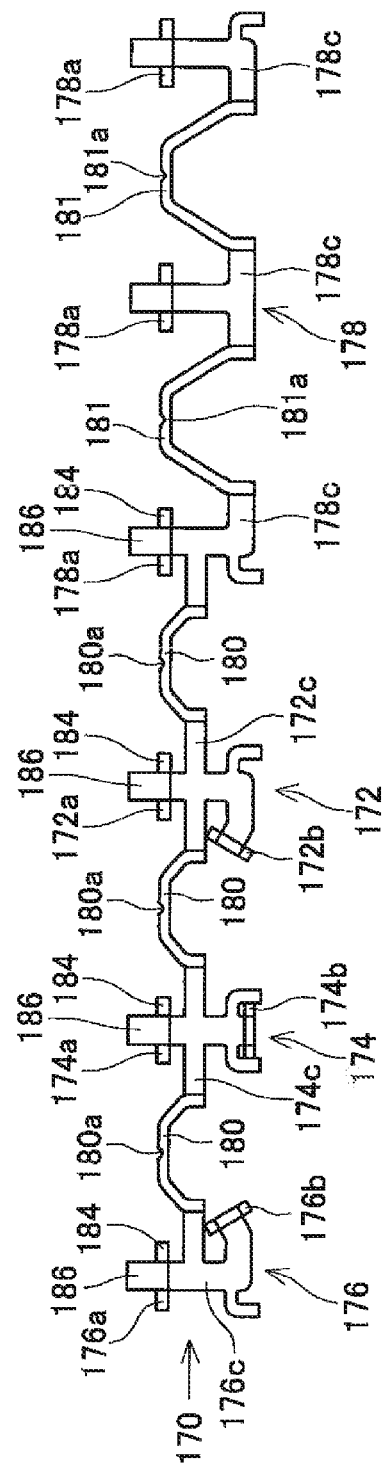
FIG. 10 shows a diagram of a terminal member in the second embodiment viewed from above.

As shown in FIG. 9, the terminal member 170 comprises external terminal portions 172, 174, and 176 and a common terminal portion 178. When viewed from above, the terminal portions 172 to 178 are disposed juxtaposed on a straight line. As shown in FIG. 10, a configuration of the external terminal portions 172 to 176 is the same as the configuration of the external terminal portions 72 to 76 in the first embodiment. Like the external terminal portions 72 to 76, the external terminal portions 172 to 176 comprise fitting portions 184, adhering portions 172a to 176a, connector portions 172b to 176b, and base portions 172c to 176c.

The external terminal portion 174 is connected to the external terminal portions 172 and 176 respectively by connecting portions 180. The connecting portions 180 are made of a material same as a material of the external terminal portion 172 and the like, i.e., a conductive material (metal). The connecting portions 180 are formed when the terminal member 170 is molded by pressing. Cut-off portions 180a are formed in intermediate portions of the connecting portions 180. Thickness of the cut-off portions 180a is smaller than thickness of other portions of the connecting portions 180. That is, rigidity of the cut-off portions 180a of the connecting portions 180 is lower than rigidity of other portions thereof. The external terminal portion 176 is connected to the common terminal portion 178 by the connecting portion 180.

The common terminal portion 178 comprises three adhering portions 178a, three base portions 178c, and three fitting portions 184. The adhering portions 178a and the fitting portions 184 respectively have configurations same as the configurations of the adhering portions 78a and the fitting portions 84 in the first embodiment. In FIG. 10, concerning one adhering portion 178a, the fitting portion 184 and a hook portion 186 are denoted by reference numerals. The three base portions 178c are disposed on a plane on which the three base portions 172c to 176c are disposed. The adhering portions 178a are connected to the base portions 178e. The base portions 178c are connected to the other base portions 178c adjacent thereto by connecting portions 181. The connecting portions 181 are made of a material same as a material of the common terminal portion 178 and the like, i.e., conductive material. The connecting portions 181 are molded when the terminal member 170 is molded by the pressing. Deformed portions 181a are formed in intermediate portions of the connecting portions 181. Thickness of the deformed portions 181a is smaller than thickness of other portions of the connecting portions 181. That is, rigidity of the deformed portions 181a is lower than rigidity of the other portions of the connecting portions 181.

Figure 13:
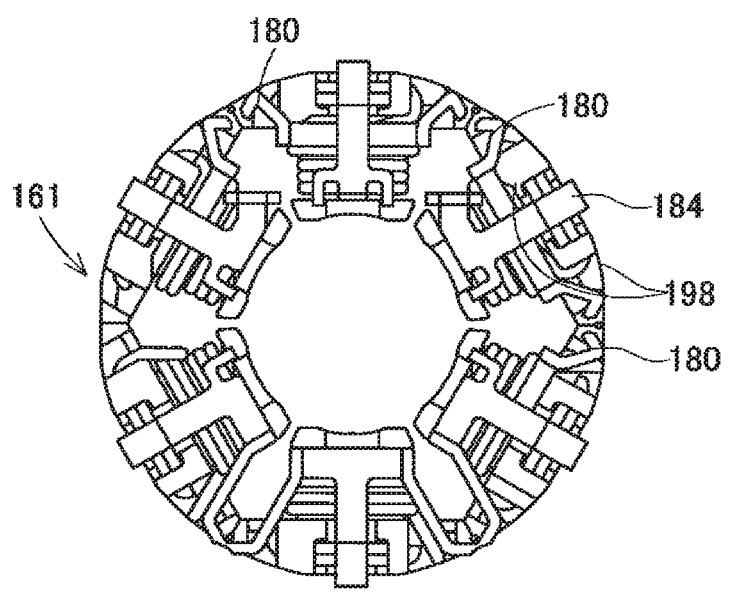
FIG. 13 shows a stator in the second embodiment viewed from above.

As shown in FIG. 13, the stator member 160 is deformed in an annular shape. Further, the cut-off portions 180a are cut, whereby a stator 161 is manufactured. In the core member 190, the plurality of core plates 162 is deformed, whereby the plurality of cores 190a to 190f is disposed in an annular shape. In the terminal member 170, the cut-off portions 180a of the connecting portions 180 and the deformed portions 181a of the connecting portions 181 are deformed, whereby the external terminal portions 172 to 176 and the three common terminal portions 178 are disposed in an annular shape. Rigidity of the cut-off portions 180a and the deformed portions 181a is lower than rigidity of other portions of the connecting portions 180 and 181. Therefore, when the cut-off portions 180a and the deformed portions 181a are deformed, it is possible to suppress the other portions of the connecting portions 180 and 181 from being deformed.

As shown in FIG. 11, when viewed from above, the core member 190 is formed on a straight line. In this configuration, positional accuracy of the insertion grooves 198 of the core member 190 is high compared with positional accuracy of insertion grooves of an annular core member. Therefore, when one fitting portion 184 and one pair of insertion grooves 198 are aligned, it is possible to suppress positions of the other fitting portions 184 and the other insertion grooves 198 from shifting. Further, with this configuration, compared with a configuration in which a terminal member and a core member are formed in an annular shape, it is easy to align positions of the fitting portions 184 and the insertion grooves 198.

In this embodiment, as in the first embodiment, the fitting portions 184 are fitted in the pairs of insertion grooves 198 in a state where the fitting portions 184 are elastically deformed, whereby the terminal member 170 is fixed to the core member 190. With this configuration, when the stator 161 is manufactured using the terminal member 170, the terminal member 170 (i.e., a terminal of the stator 161) is stably supported by the core member 190 (i.e., a core of the stator 161).

As in the first embodiment, when the terminal member 170 is assembled to the core member 190, it is possible to easily assemble the coils 196 to gaps of the adhering portions 172a to 178a. Adhering sections of the coils 196 are supported by the pairs of supporting portions 199. Therefore, when the terminal member 170 is assembled to the core member 190, positions of the adhering sections of the coils 196 are prevented from shifting.

The terminal member 170 is molded by pressing. With this configuration, it is possible to easily manufacture the terminal members 170.

In a modification, the core member 190 may be assembled to the terminal member 170 after the terminal member 170 and the core member 190 are individually formed in an annular shape. Then, the cut-off portions 180a may be cut.

Third Embodiment

Figure 14:
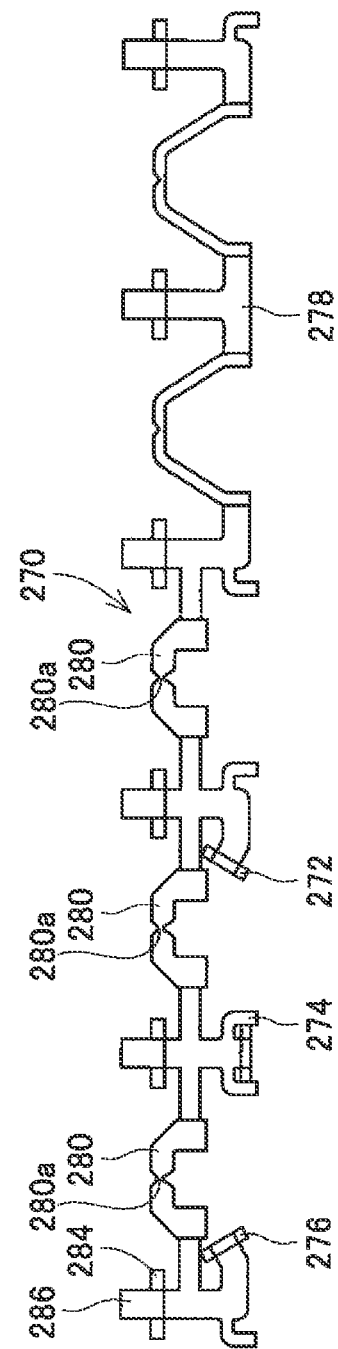
FIG. 14 shows a diagram of a terminal member in a third embodiment viewed from above.

As shown in FIG. 14, a configuration of a terminal member 270 is different from the configuration of the terminal member 170. Since other components are the same as the components in the second embodiment, explanation of the components is omitted.

The terminal member 270 comprises external terminal portions 272, 274, and 276, a common terminal portion 278, and connecting portions 280. The common terminal portion 278 has a configuration same as the configuration of the common terminal portion 178. The external terminal portions 272, 274, and 276 have a configuration same as the configuration of the external terminal portions 172, 174, and 176. The external terminal portion 274 is connected respectively to the external terminals 272 and 276 by the connecting portions 280. The connecting portions 280 are made of resin. The connecting portions 280 can be formed of any material that is nonconductive, such as rubber. Deformed portions 280a are formed in intermediate portions of the connecting portions 280. Thickness of the deformed portions 280a is smaller than thickness of other portions of the connecting portions 280. That is, rigidity of the deformed portions 280a is lower than rigidity of the other portions of the connecting portions 280.

Figure 15:
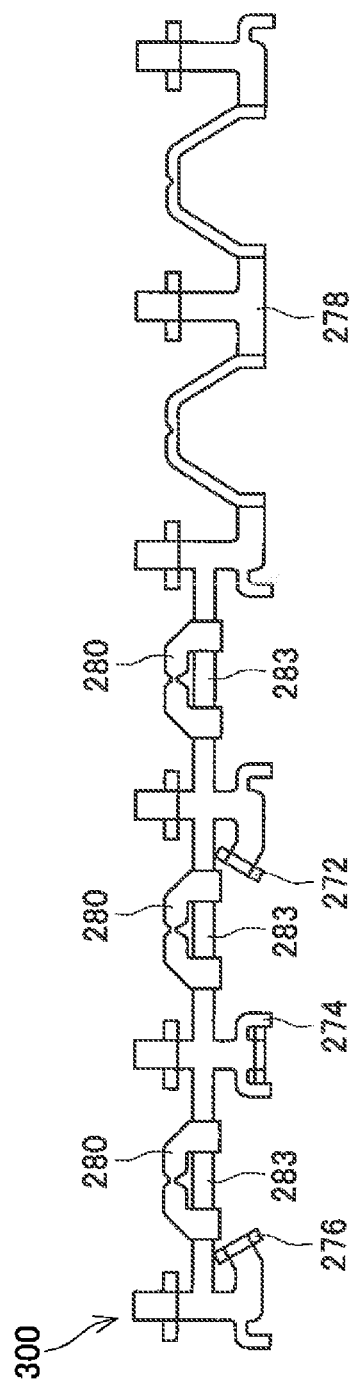
FIG. 15 shows a diagram of an intermediate component of the terminal member in the third embodiment viewed from above.

The terminal member 270 is manufactured from a component 300 shown in FIG. 15. In the component 300, the external terminal portions 272, 274, and 276 and the common terminal portion 278 are connected by cut-off portions 283. Specifically, the component 300 is molded by pressing. Subsequently, the component 300 is disposed in a resin molding die and the connecting portions 280 are molded. The cut-off portion 283 located in one connecting portion 280 is cut, whereby the terminal member 270 is manufactured.

With this configuration, it is possible to attain an effect same as the effect in the second embodiment. Since the connecting portions 280 are made of resin, the terminal portions 272 to 278 are insulated. Therefore, when a stator is manufactured using a stator member, the connecting portions 280 do not have to be cut.

(Modifications)

(1) In the embodiments, the terminal member 70 or the like comprises the six fitting portions 84 or the like corresponding to the six cores 90a or the like. However, the terminal member 70 or the like may comprise at least two or more and preferably three or more fitting portions 84 or the like. In this case, the core member 90 or the like may comprise the pairs of insertion grooves 98 or the like in a position corresponding to the fitting portions 84 or the like.

(2) In the embodiments, the fitting portions 84 or the like are fitted between the pairs of insertion grooves 98 or the tike. However, the core member 90 or the like may comprise, instead of the pairs of insertion grooves 98 or the like, insertion holes in which the fitting portions 84 are fitted. In this modification, the insertion holes are an example of the "recessed portions".

(3) in the embodiments, each of the fitting portions 84 or the like comprises the pair of insertion portions 84a. However, the fitting portion 84 or the like may comprise one insertion portion or may comprise three or more insertion portions. In general, the fitting portions 84 only has to be configured to be elastically deformed in a state where the fitting portions 84 are inserted in the recessed portions of the core member 90 or the like.

Figure 16:
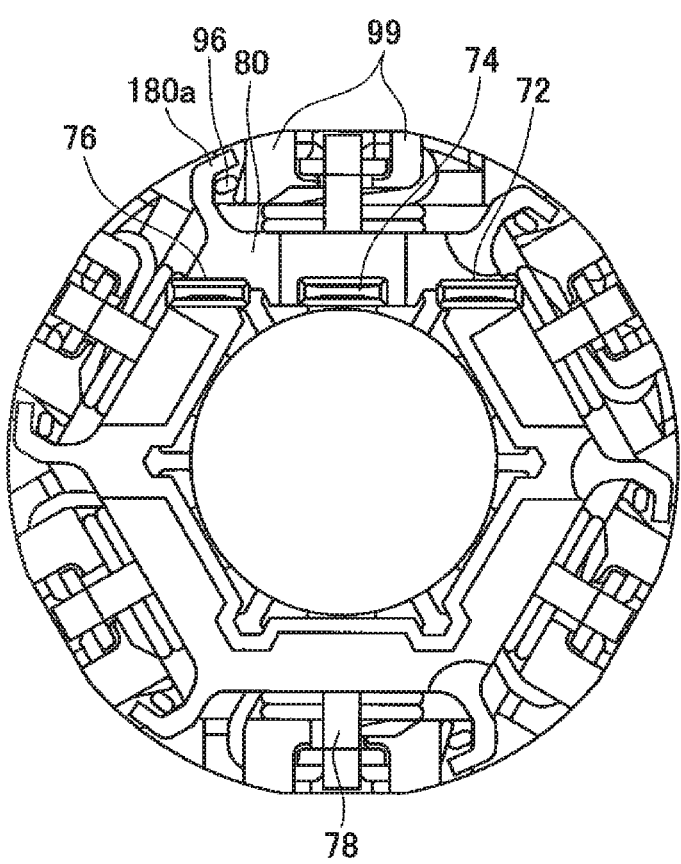
FIG. 16 shows a diagram of a state where a terminal member and a core member are assembled in a modification viewed from above.

(4) A configuration of restricting portions that restrict the ends of the oils 96 from moving to the outer circumferential side of the core member 90 is not limited to the configuration of the projection portions 80a. As shown in FIG. 16, projection portions 180a may be provided instead of the projection portions 80a. The projection portions 180a may extend from the annular portion of the connecting portion 80 to the outer circumference of the core member 90. Further, the projection portions 180a may be disposed further on the outer circumferential side of the core member 90 than the extending portions of the coils 96 supported by the supporting portions 99.

(5) The stator 60 and the stator member 160 manufactured in the embodiments may be used for a brushless motor set in an electric pump such as a cooling water pump and other apparatuses other than the motor section 50 of the fuel pump 10.

What is claimed is:

1. A stator member to be used in a stator of a brushless motor, the stator member comprising:
   a core member comprising a plurality of cores disposed juxtaposed to one another, a coil being wound around each of the cores; and
   a terminal member attached to one end of the core member, wherein the terminal member comprises:
      a terminal section comprising three external terminal portions used as terminals of U, V, and W phase and a common terminal portion used as a common terminal, the three external terminal portions and the common terminal being integrally provided, and
      a plurality of fitting portions protruding from the terminal section toward the core member,
   each of the plurality of fitting portions is fitted into a corresponding one of a plurality of recessed portions formed at the one end of the core member in an elastic deformed state,
   the coil being wound around the each of the plurality of the cores extends to a terminal member side of the each of the plurality of cores,
   the each of the plurality of cores comprises a pair of supporting portions disposed on an end of the core on the terminal member side and supporting the corresponding coil extending to the terminal member side,
   each of the three external terminal portions and the common terminal portion comprises an adhering portion adhered to a part of the corresponding coil that is supported between the pair of supporting portions,
   one end of the part of the coil that is supported between the pair of supporting portions extends toward an inner side of the core member in a state where the plurality of cores is disposed in an annular shape,
   the one end of the part of the coil that is supported between the pair of supporting portions connects with the coil being wound around the corresponding core,
   another end of the part of the coil between the pair of supporting portions extends toward the inner side of the core member in a state where the plurality of cores is disposed in the annular shape, and
   the terminal member comprises a nonconductive restricting portion disposed along the other end of the part of the coil at an opposite side of the pair of supporting portions and restricting the other end of the part of the coil from moving more toward an outer side than an outer circumferential plane formed by the plurality of cores in the state where the plurality of cores is disposed in the annular shape.

2. The stator member as in claim 1, wherein
   each of the three external terminal portions further comprises:
   a base portion connected to a juxtaposed external terminal portion, and
   a connector portion configured to be connected to a connector of an external power source and extending from the base portion to an opposite side of the core member, and
   the adhering portions of the three external terminal portions extend from the base portion to the opposite side of the core member and are disposed on an outer circumferential side of the connector portions in a state where the three external terminal portions and the common terminal portion are disposed in an annular shape.

3. The stator member as in claim 1, wherein
   each of the adhering portions is disposed by sandwiching an adhering section of the corresponding con, and
   the adhering portions are connected to one another on the opposite side of the core member than where the adhering sections of the cons are positioned.

4. The stator member as in claim 3, wherein
   each of the adhering portions comprises a hook portion, wherein each adhering portion and hook portion sandwich the adhering section of the corresponding coil, and
   the adhering portions and the hook portions are connected to one another on the opposite side of the core member than where the adhering sections of the coils are positioned.

5. The stator member as in claim 1, wherein
   the stator member is used in a stator of a brushless motor disposed in an electric pump,
   the stator member further comprises an outer wall made of resin that covers at least a part of the terminal member, the core member, or both the terminal member and the core member, and
   the outer wall comprises an outlet that discharges fluid pressurized by the electric pump to outside the electric pump.

6. The stator member as in claim 1, wherein
   the terminal member further comprises a nonconductive connecting portion that connects the three external terminal portions and the common terminal portion.

7. The stator member as in claim 1, wherein
   the terminal member further comprises a connecting portion that connects the three external terminal portions and the common terminal portion,
   the connecting portion is formed of a same material as the three external terminal portions and the common terminal portion, and
   the connecting portion comprises one or more cut-off portions configured to be cut off before applying current to the coils.

* * * * *